July 20, 1954 G. W. CROWELL 2,684,080
CHECK VALVE
Filed June 22, 1950

INVENTOR,
Gordon W. Crowell
BY
Adams, Forward and McLean
ATTORNEYS

Patented July 20, 1954

2,684,080

UNITED STATES PATENT OFFICE 2,684,080

CHECK VALVE

Gordon W. Crowell, Glen Ridge, N. J.

Application June 22, 1950, Serial No. 169,604

1 Claim. (Cl. 137—515.5)

This invention relates to check valves and more particularly to a new and improved one way type check valve designed to comprise a minimum number of parts and capable of operation in any position in a manner which insures a fluid-tight seal.

It is an object of the present invention to provide a check valve whose valve seat is unaffected by the abrasive action of the fluid flow.

Another object is the provision of a new and improved piston means which performs the functions of preventing return flow, providing fluid passageways of low flow resistance, and providing means for preventing bottoming of the piston in its cylinder.

Another object of the present invention is to provide in combination with the check valve structure, means which are adapted to coact with an easily removable resilient conduit member to provide a fluid-tight seal.

Another object of the invention is to provide a check valve structure consisting of a minimum number of parts which are so constructed and arranged as to provide excellent wearing characteristics without sacrificing the efficiency thereof.

These objects and many of the attendant advantages will become more apparent when taken in the light of the following specification.

The invention will be further described in connection with the appended drawings which illustrate one form of apparatus which may be used with advantage in practicing the invention.

Figure 1:
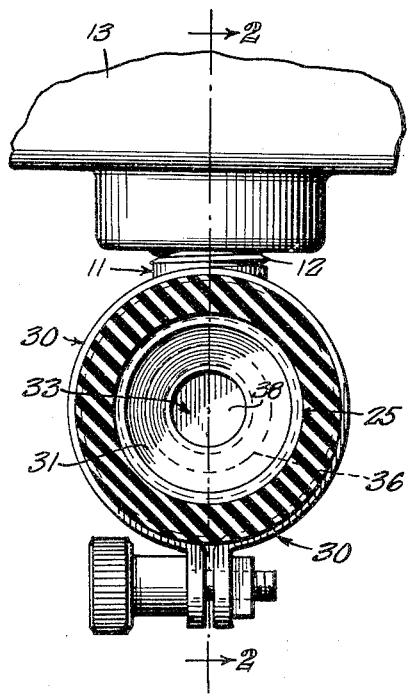
Fig. 1 is a view of the upstream end of a check valve embodying the instant invention.

In the drawings I have illustrated a preferred embodiment of my one way check valve which is designed to receive a resilient conduit member, but it will be appreciated that it is capable of other uses, provided a leak-preventing means is disposed about the joint between the two halves of the check valve.

Figure 2:
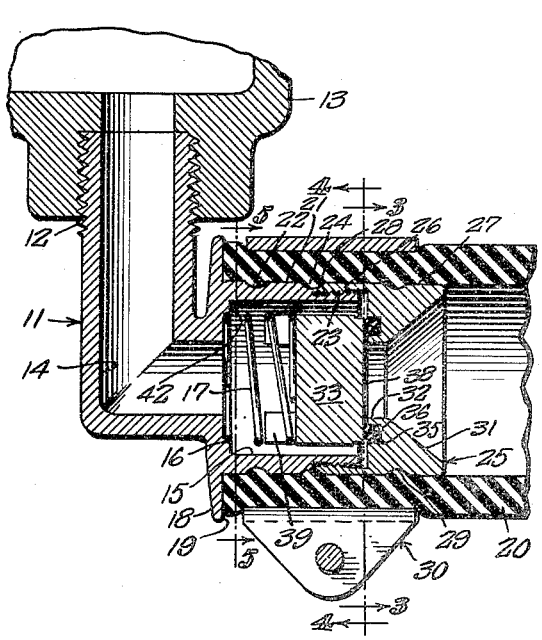
Fig. 2 is a longitudinal sectional view taken on line 2—2 in Fig. 1.

The check valve comprises a plug member 11 which has a coupling end 12 for connection to the downstream part of a fluid line which in Figs. 1 and 2 is a container 13. A bore 14 passes through the plug member 11 and forms a chamber or cylinder 15 in the upstream end thereof. The cylinder 15 has a reduced portion 16 in which a spring means is seated. An annular flange 18 is connected to the outside of said plug member 11 and provides a surface 19 against which a removable resilient member 20 may abut. A tubular portion 21 having a first annular groove 22 extends upstream from the flange 18 and is contained within the resilient member 20. Disposed on the outer upstream end of the plug member 11 is a male threaded portion 23 of reduced diameter having a convex annular surface 24 which extends outwardly to the tubular portion 21.

A body member 25 is connected to the plug member 11 by means of a female threaded portion 26. The outer surface 27 of the body member 25 combines with the tubular portion 21 of the plug member 11 to provide a smooth and continuous surface over which the resilient conduit member 20 may readily be placed. A curved portion 28 combines with the convex annular surface 24 to form a second annular groove at the joint between the body member 25 and the plug member 11. A third annular groove 29 is provided at the upstream end of the body member 25. As shown in Fig. 2, portions of the rubber hose 20 fill the three grooves thereby peventing leakage from the threaded connection of the body member and the plug member. A clamping means 30 may be utilized to insure tight sealing.

Figure 3:
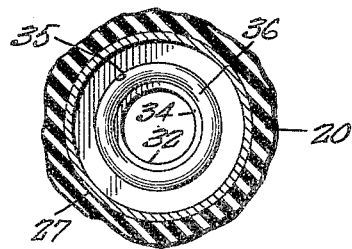
Fig. 3 is a transverse sectional view taken on line 3—3 in Fig. 2.

The body member 25 has a passage therethrough which defines a funnel 31 and a spout 32. As is evident from Figs. 2 and 3, the spout 32 is surrounded by a valve seat which has an inner annular surface 34 and an intermediate annular groove 35 which is square or other than round in cross section. A resilient sealing member such as an O ring 36 is partially disposed within the annular groove 35 in a manner such that part of the resilient member protrudes outwardly for engagement with the piston 33. Since the O ring 36 does not completely fill the annular groove 35, a high back pressure will cause the piston 33 to force the O ring 36 completely into the annular groove 35, thereby allowing the piston 33 to contact the inner annular surface 34.

Figure 4:
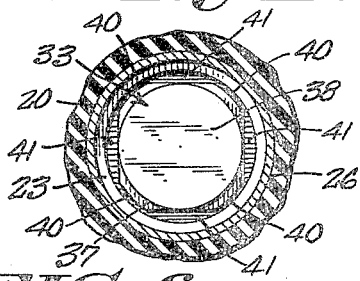
Fig. 4 is a transverse sectional view taken on line 4—4 in Fig. 2.
Figure 5:
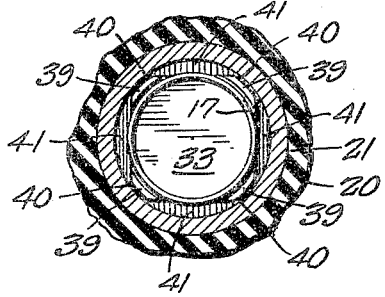
Fig. 5 is a transverse sectional view taken on line 5—5 in Fig. 2.
Figure 6:
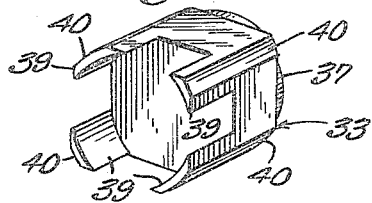
Fig. 6 is a detail perspective view of a piston employed in the valve assembly shown in Fig. 2.

It will be noted from Figs. 4 and 6 that the piston 33 has a head portion 37 which includes a circular piston face 38 which is adapted to coact with the valve seat to provide a fluid-tight seal. A plurality of leg portions 39 are connected to the downstream end of the head portion 37, the outer portions thereof providing guide members for the piston and the inner portions thereof defining an enclosure or housing for the spring 17 as shown in Fig. 5.

As seen in Fig. 6 the guide members or leg portions 39 are diametrically opposed and have longitudinal bearing surfaces 40 which are in slidable engagement with the wall of the cylinder 15. By this arrangement a plurality of fluid passageways 41 are defined around the piston 33, these passageways being so constructed and arranged as to provide a flow cross sectional area which may be equal to or greater than the cross sectional area of the spout 32. It will be evident from Fig. 2 that the fluid passing through the spout 32 will impinge upon the piston face 38 and be equally distributed radially outward from the center thereof. The fluid will then pass by the annular side wall of the head portion 37, into passageways 41, between the guide members 39 into the spring housing and finally into the bore 14. This provides an easy path for the fluid flow with a minimum of frictional losses since the flow area is always substantially equal to or greater than the flow area of spout 32.

When a fluid pressure of sufficient value is present at the piston face 38, the piston 33 will be moved downstream, thereby compressing the spring 17 and allowing the fluid to pass around the piston and into the bore 14. If the fluid pressure is sufficiently great, the piston 33 will be moved downstream until the legs 39 contact the annular end wall 42 of the cylinder 15. It is evident, therefore, that the legs 39 not only house the spring 17 but they also provide fluid passageways which prevent bottoming of the piston in the cylinder. When the flow of fluid is stopped, the spring 17, in combination with the back pressure on the downstream part of the line, will cause the piston 33 to move upstream and positively engage the valve seat. As previously stated, if the back pressure is sufficiently great, the piston will force the O ring 36 completely into the annular groove 35, thereby allowing metal-to-metal contact between the piston face 38 and the inner annular surface 34 which provides great strength at the seal and enables the valve to withstand extremely high back pressure.

The piston face 38 is, of course, subject to wear by the abrasive action of the fluid which flows radially outward from the center of the seating surface. But since the fluid flow is evenly distributed over the seating surface 38, the over-all wear is substantially the same. As the fluid passes by the annular side wall of the head portion 37, the flow is divided into four channels defined by the guide members 39. It is evident from Figs. 2 and 4 that this division of flow occurs downstream from the piston face 38, thereby insuring a smooth flow across the piston face. As a further insurance against uneven wear of the piston face 38, the piston is capable of rotation in response to axial forces inherent in the fluid flow, thereby causing different portions of the face 38 to be brought into contact with the valve seat.

By positioning the valve seat so that it faces downstream, the abrasive action thereon by impingement by particles of sand and other foreign matter included in the fluid is completely avoided. Since the inner annular surface 34 of the valve seat is subject to substantially no wear and since the piston face 38 is subject to even wear especially at the outer portion thereof, a perfect leak proof metal-to-metal seal is formed when the back pressure is of a sufficiently high value to force the O ring 36 completely into the groove 35. When a low back pressure is present, the inherent resiliency of the O ring is sufficient to insure a leak proof seal. It is obvious, therefore, that the life of my check valve is substantially prolonged.

The selection of the spring will be dictated by the fluid pressure differential required to open the valve and it will be understood that the valve may be adapted to fluid lines and installations of a wide variation of fluid pressures.

While I have shown and described the preferred embodiment of my invention, I do not desire to be limited to any of the details of construction shown and described herein except as defined in the appended claim.

I claim:

In a check valve for a fluid line a plug member having a tubular portion with a male threaded portion of reduced diameter at the upstream end and a peripheral flange at the downstream end of said tubular portion, said tubular portion having a concave annular surface between said threaded portion and tubular portion and a first annular groove, a body member threaded on said male threaded portion having a third annular groove and a concave portion at the downstream end of said body member which forms a second annular groove with said concave annular surface on said tubular portion, said peripheral flange providing a surface against which a resilient conduit member may abut and the annular grooves providing spaces into which said conduit member may be forced to provide a fluid-tight seal, and a valve seat in said body member including an inner annular surface and an intermediate groove of square cross-section; a resilient ring partially disposed within said groove; a piston slidably and rotatably positioned within said tubular portion including a substantially square body portion, a circular head portion extending downstream from said body portion providing a flat face for engagement with said valve seat, the side edges of said square body portion being curved to conform with the inner wall of said tubular portion to enable smooth sliding contact therewith, and four leg portions extending downstream from the side edges of said body portion, each leg portion having a curved outer surface to enable smooth sliding contact with the inner wall of said tubular portion, said four leg portions forming a spring housing; and a coiled spring seated in said tubular portion and extending into said spring housing for biasing said piston toward said valve seat.

References Cited in the file of this patent

UNITED STATES PATENTS

| Number | Name | Date |
| --- | --- | --- |
| 784,534 | Bassett | Mar. 14, 1905 |
| 852,334 | Lewis | Apr. 30, 1907 |
| 1,246,458 | Philbrook | Nov. 13, 1917 |
| 1,634,153 | Long | June 28, 1927 |
| 2,335,814 | Stevenson | Nov. 30, 1943 |
| 2,524,951 | Ashton | Oct. 10, 1950 |